(12) United States Patent
Morikawa et al.

(10) Patent No.: US 7,601,385 B2
(45) Date of Patent: Oct. 13, 2009

(54) RADIATION IMAGE CONVERSION PANEL AND PREPARATION METHOD THEREOF

(75) Inventors: Osamu Morikawa, Hachioji (JP); Takehiko Shoji, Hachioji (JP); Shinji Kudo, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 669 days.

(21) Appl. No.: 11/108,740

(22) Filed: Apr. 19, 2005

(65) Prior Publication Data

US 2005/0238797 A1 Oct. 27, 2005

(30) Foreign Application Priority Data

| Apr. 22, 2004 | (JP) | ............................... 2004-126461 |
| Jul. 7, 2004 | (JP) | ............................... 2004-200435 |
| Jul. 22, 2004 | (JP) | ............................... 2004-214207 |

(51) Int. Cl.
*B05D 5/06* (2006.01)

(52) U.S. Cl. .......................... 427/69; 427/65; 250/484.4

(58) Field of Classification Search .................... 427/64, 427/69, 65; 250/484.4
See application file for complete search history.

(56) References Cited

U.S. PATENT DOCUMENTS

| 4,947,046 | A | | 8/1990 | Kawabata et al. | |
| 5,819,549 | A | * | 10/1998 | Sherwood | ..................... 62/246 |
| 5,925,611 | A | * | 7/1999 | Flynn et al. | .................. 510/412 |
| 6,177,030 | B1 | * | 1/2001 | Shoji et al. | ............ 252/301.4 H |
| 6,491,979 | B1 | * | 12/2002 | Yamaguchi et al. | ...... 427/385.5 |
| 2003/0151001 | A1 | * | 8/2003 | Honda et al. | ............. 250/484.4 |
| 2003/0186023 | A1 | * | 10/2003 | Isoda et al. | ................... 428/98 |
| 2004/0041100 | A1 | * | 3/2004 | Maezawa et al. | ......... 250/484.4 |
| 2004/0146639 | A1 | * | 7/2004 | Isoda | ......................... 427/157 |
| 2004/0229061 | A1 | * | 11/2004 | Kasai et al. | ................. 428/485 |
| 2004/0262535 | A1 | * | 12/2004 | Leblans | .................... 250/483.1 |

FOREIGN PATENT DOCUMENTS

| EP | 1 396 864 A2 | 3/2004 |
| EP | 1 411 372 A1 | 4/2004 |
| WO | WO 96/22356 | 7/1996 |

OTHER PUBLICATIONS

European Search Report dated Feb. 11, 2008.

* cited by examiner

*Primary Examiner*—Timothy H Meeks
*Assistant Examiner*—Elizabeth Burkhart
(74) *Attorney, Agent, or Firm*—Finnegan, Henderson, Farabow, Garrett & Dunner, L.L.P.

(57) ABSTRACT

It is an object to provide a radiation image conversion panel exhibiting excellent properties in luminance and sharpness, and a preparation method thereof. Provided also is a drastically increased amount of stimulated luminescence of a post-manufacture radiation image conversion panel. Disclosed is a method for manufacturing a radiation image conversion panel in which a stimulable phosphor layer having a thickness of not less than 50 μm is formed on a support vapor deposition and then is heat-treated, wherein a ratio of transmittance $T/T_0$ (T represents transmittance after heat-treating, and $T_0$ before heat-treating) at a stimulated luminescence wavelength of the stimulable phosphor is $0.5 \leq T/T_0 \leq 10$. Also disclosed is a method for manufacturing a radiation image conversion panel via conducting a process of soaking in a halogenated solvent, as well as a process of heating a phosphor panel possessing a stimulable phosphor layer.

8 Claims, 4 Drawing Sheets

RADIATION IMAGE CONVERSION PANEL AND PREPARATION METHOD THEREOF

TECHNICAL FIELD

The present invention relates to a radiation image conversion panel used for forming radiation images of an object, employing a stimulable phosphor and its manufacturing method, and specifically relates to a radiation image conversion panel having high luminance and enhanced sharpness, and its manufacturing method.

BACKGROUND

In recent years, radiographic imaging methods have been employed using a radiation image conversion panel employing photo-stimulable phosphors (hereinafter also denoted simply as stimulable phosphors).

It is essential that the stimulable phosphor layer of the radiation image conversion panel employed in a radiation image conversion method exhibits a high radiation absorption rate and a high light conversion rate, and also exhibits fine image graininess and excellent image sharpness.

Up to this point, many investigations have been made to enhance the sensitivity and the image quality by adjusting plural factors. Of these, as a means of improving radiation image sharpness, for example, many attempts have been made to enhance the sensitivity and the sharpness by controlling the shape of a stimulable phosphor which is formed.

One example used as a method in the trials was a stimulable phosphor layer comprising minute pseudo-columnar blocks deposited onto a support having an indented pattern surface, as described in Japanese Patent O.P.I. Publication 61-142497.

Further, the following trial methods are disclosed, for example; to use a radiation image conversion panel comprised of a stimulable phosphor layer which has been subjected to a shock treatment to develop cracks among the columnar blocks by depositing the stimulable phosphor on the support having a minute patterned surface as described in Japanese Patent O.P.I. Publication 61-142500; to use a radiation image conversion panel comprised of a stimulable phosphor layer formed on the support, on which surface cracks are generated from the surface side to be pseudo columnar as described in Japanese Patent O.P.I. Publication 62-39737; to provide a stimulable phosphor layer possessing voids which is formed on the support via vapor deposition, followed by being subjected to heat treatment which expands the voids into cracks, as described in Japanese Patent O.P.I. Publication 62-110200.

Disclosed is the radiation image conversion panel comprised of a stimulable phosphor layer, formed on the support via vapor deposition, which has elongated columnar crystals inclined to the line normal to the support as disclosed in Patent Document 1.

All of the trials to control the shape of the stimulable phosphor layer are to make the columnar crystals to prevent stimulated emission light (stimulated. luminescence) from diffusing in the lateral direction (emitted light reaching the surface of the support by repeated reflection at the boundary of the cracks or columnar crystals). Such prevention of lateral diffusion results in significantly enhanced sharpness of an image formed via stimulated luminescence.

Attempts have been made to improve image quality, specifically, sharpness in radiation image conversion panels having a stimulable phosphor layer which was formed via gas phase growth (deposition), as described in Patent Document 2. This was achieved by combining a phosphor layer comprised of columnar stimulable phosphor crystals described above with a low refractive layer, thereby preventing reflection or refraction at the interface between layers and resulting in enhanced image quality.

However, the requirements for improving the luminance and the sharpness are not satisfied by such a radiation image conversion panel having a stimulable phosphor layer formed via vapor deposition, and further improvement has been sought.

[Patent Document 1] Japanese Patent O.P.I. Publication 2-58000

[Patent Document 2] Japanese Patent O.P.I. Publication 1-131498

SUMMARY

It is an object of the present invention to provide a radiation image conversion panel exhibiting superior luminance and enhanced sharpness, and a manufacturing method thereof.

DESCRIPTION OF THE PREFERRED EMBODIMENTS

Figure 1:
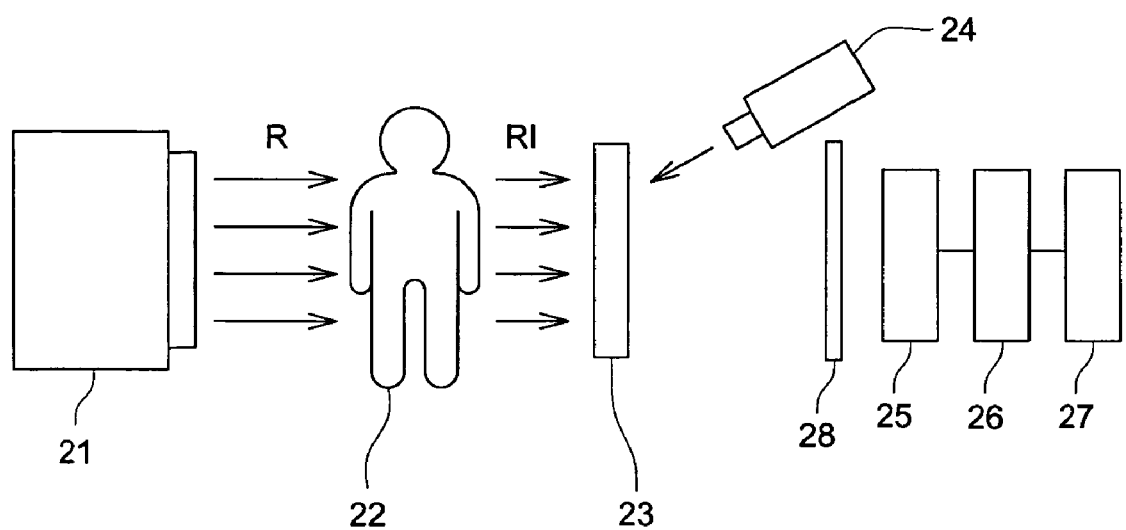
FIG. 1 is a schematic drawing showing an example of using a radiation image conversion panel according to the present invention.

The foregoing object can be accomplished via the following structures.

(Structure 1) A method for manufacturing a radiation image conversion panel in which a stimulable phosphor layer having a thickness of not less than 50 μm is formed on a support via vapor deposition and then is heat-treated, wherein a ratio of transmittance $T/T_0$ (T represents transmittance after heat-treating, and $T_0$ before heat-treating) at a stimulated luminescence wavelength of a stimulable phosphor is $0.5 \leq T/T_0 \leq 10$.

(Structure 2) The method for manufacturing the radiation image conversion panel of Structure 1, wherein the ratio of transmittance $T/T_0$ at a stimulated luminescence wavelength of the stimulable phosphor is $0.6 \leq T/T_0 \leq 3$.

(Structure 3) The method for manufacturing the radiation image conversion panel of Structure 1 or 2, wherein the foregoing heat treatment is conducted in the presence of a fluorine-containing organic compound.

(Structure 4) The method for manufacturing the radiation image conversion panel in which a stimulable phosphor layer having a thickness of not less than 50 μm is formed on a support via vapor deposition and then is heat-treated, wherein the foregoing heat treatment is conducted in the presence of a fluorine-containing organic compound having a boiling point between 50 and 100° C.

(Structure 5) The method for manufacturing the radiation image conversion panel of Structure 4, wherein the fluorine-containing organic compound is an ether compound containing hydrogen and fluorine atoms.

(Structure 6) The method for manufacturing the radiation image conversion panel of any one of Structures 1-5, wherein a stimulable phosphor layer formed on a support contains a stimulable phosphor as expressed in following General Formula (1).

$$M^1X \cdot aM^2X'_2 \cdot bM^3X''_3 : eA \qquad (1)$$

in which $M^1$ is an alkali metal selected from the group including Li, Na, K, Rb and CS; $M^2$ is a di-valent metal selected from the group including Be, Mg, Ca, Sr, Ba, Zn, Cd, Cu and Ni; $M^3$ is a tri-valent metal selected from the group including Sc, Y, La, Ce, Pr, Nd, Pm, Sm, Eu, Gd, Tb, Dy, Ho, Er, Tm, Yb, Lu, Al, Ga and In; X, X' and X" are each a halogen selected from the group including F, Cl, Br and I; A is a metal selected from the group represented by the group including Eu, Tb, In, Ga, Cs, Tm, Dy, Pr, Ho, Nd, Yb, Er, Gd, Lu, Sm, Y, Tl, Na, Ag, Cu and Mg; and "a", "b" and "e" are each a value within the range of $0 \leq a < 0.5$, $0 \leq b < 0.5$ and $0 < e \leq 0.2$, respectively.

(Structure 7) The method for manufacturing the radiation image conversion panel of Structure 6, wherein $M^1$ in General Formula (1) is at least one alkali metal selected from the group including K, Rb and Cs.

(Structure 8) The method for manufacturing the radiation image conversion panel of Structure 6 or 7, wherein X in General Formula (1) is at least one halogen selected from the group including Br and I.

(Structure 9) The method for manufacturing the radiation image conversion panel of any one of Structures 6-8, wherein $M^2$ in General Formula (1) is at least one di-valent metal selected from the group including Be, Mg, Ca, Sr and Ba.

(Structure 10) The method for manufacturing the radiation image conversion panel of any one of Structures 6-9, wherein $M^3$ in General Formula (1) is at least one tri-valent metal selected from the group including Y, Ce, Sm, Eu, Al, La, Gd, Lu, Ga and In.

(Structure 11) The method for manufacturing the radiation image conversion panel of any one of Structures 6-10, wherein "b" in General Formula (1) is a value within the range of $0 \leq b \leq 0.01$.

(Structure 12) The method for manufacturing the radiation image conversion panel of any one of Structures 6-11, wherein "A" in General Formula (1) is at least one metal selected from the group including Eu, Cs, Sm, Tl and Na.

(Structure 13) The method for manufacturing the radiation image conversion panel of any one of Structures 6-12, wherein the stimulable phosphor comprises columnar crystals.

(Structure 14) The method for manufacturing the radiation image conversion panel of Structure 13, wherein the columnar crystals comprise the stimulable phosphor represented in following General Formula (2).

$$CsX;A \qquad (2)$$

in which X is Br or I, and A is Eu, In, Ga or Ce.

(Structure 15) A method for manufacturing a radiation image conversion panel comprising a support having thereon a stimulable phosphor layer; the method comprising the steps of: (i) forming the stimulable phosphor layer of a thickness of not less than 50 μm on the support via vapor deposition; and (ii) conducting a process of heating the phosphor panel having the stimulable phosphor layer, so as to have the ratio of transmittance $T/T_0$ at a stimulated luminescence wavelength of a stimulable phosphor being $0.5 \leq T/T_0 \leq 10$.

(Structure 16) A method for manufacturing a radiation image conversion panel comprising a support having thereon a stimulable phosphor layer; the method comprising the steps of: (i) forming the stimulable phosphor layer of a thickness of not less than 50 μm the support via vapor deposition; and (ii) conducting a process of soaking in a halogenated solvent, and a process of heating the phosphor panel having the stimulable phosphor layer, so as to have the ratio of transmittance $T/T_0$ at a stimulated luminescence wavelength of a stimulable phosphor being $0.5 \leq T/T_0 \leq 10$.

(Structure 17) A method for manufacturing a radiation image conversion panel by conducting processes comprising: (a) a process of soaking, in a halogenated solvent, a phosphor panel containing a stimulable phosphor layer formed on a given substrate via vapor deposition; and (b) a process of heating the foregoing phosphor panel at a temperature in the range between 60 and 200° C. under air or an inert gas atmosphere, during or after the foregoing soaking process.

(Structure 18) The method for manufacturing a radiation image conversion panel of Structure 17, wherein the foregoing halogenated solvent is a nonflammable solvent exhibiting no flash point.

(Structure 19) The method for manufacturing a radiation image conversion panel of Structure 17 or 18, wherein the foregoing halogenated solvent is hydrofluoroether (HFE).

(Structure 20) The method for manufacturing a radiation image conversion panel of any one of Structures 17-19, wherein the foregoing halogenated solvent contains colorants which absorb stimulating light.

DETAILED DESCRIPTION OF THE INVENTION

It was found by the inventor that a radiation image conversion panel having high luminance and enhanced sharpness could be prepared by a method for manufacturing the radiation image conversion panel in which the ratio of transmittance $T/T_0$ (T represents transmittance after heat-treating, and $T_0$ before heat-treating) at a stimulated luminescence wavelength of the stimulable phosphor is $0.5 \leq T/T_0 \leq 10$, based on the method for manufacturing the radiation image conversion panel in which the stimulable phosphor layer having a thickness of not less than 50 μm is formed on a support via vapor deposition, and then is heat-treated.

The present invention will be described further in detail.

Examples of gas phase growth (deposition) of the stimulable phosphor include a vacuum evaporation method, a sputter deposition method and a CVD method. Any appropriate method may be used in the present invention. The sputter deposition method and CVD method will be hereinafter described, and a typical vacuum evaporation method will now be explained.

A stimulable phosphor layer having a thickness of not less than 50 μm is formed via vapor deposition by heating an evaporation source and generating vapor streams of a phosphor material in an evaporator having an outlet connected to a vacuum pump to maintain the interior of the evaporator in an evacuated state, a crucible for containing the evaporation source and a gas inlet to provide an inert gas if necessary. After this, the evaporator is cooled to room temperature, and the interior of the evaporator is returned to atmospheric pressure.

Described here is a method for manufacturing a radiation image conversion panel in which the ratio of transmittance $T/T_0$ at a stimulated luminescence wavelength of the stimulable phosphor is $0.5 \leq T/T_0 \leq 10$ via heating after the stimulable phosphor layer is removed from the evaporator and fed into another oven. The ratio of transmittance $T/T_0$ is preferably $0.6 \leq T/T_0$ 3.

After a stimulable phosphor layer was formed via vapor deposition, enhanced emission luminance was observed, whereby the inventor found that transmittance at a stimulated luminescence wavelength of the stimulable phosphor drops because of a heating process conducted, and luminance also drops in relation to the amount equivalent to the drop of transmittance.

A radiation image conversion panel having high luminance and enhanced sharpness can be obtained by suppressing change in transmittance of the stimulable phosphor caused by the heat-treating process.

As another method, employed is one method in which a heat treatment process is conducted by introducing a fluorine-containing organic compound gas via the gas inlet, after the stimulable phosphor layer having a thickness of not less than 50 μm is formed. The present invention is of course not limited to these examples.

Based on the present invention, while maintaining an approximate vacuum degree of $1.333 \times 10^{-3}$-1.3 Pa, it is preferred that the vacuum degree is slightly lower than that in the method of vacuum evaporation or of CVD. It is preferable in the present invention that while maintaining the above vacuum degree, an inert gas (nitrogen gas or a noble gas) is mixed with the vapor of a stimulable phosphor material to form columnar crystals in the stimulable phosphor on a support (for example, glass) in the evaporator, so as to maintain the foregoing vacuum degree.

Heat treatment is generally conducted in ambient air or an inert gas (which may contain a small amount of oxygen or hydrogen gas) at 50-600° C. for 1-8 hours. It is preferably conducted at 50-300° C. for 1-4 hours, and more preferably at 50-200° C. for 1-3 hours. Since in the case of heat treatment in ambient air or an inert gas, it is difficult to obtain the ratio of transmittance $T/T_0$ at a stimulated luminescence wavelength of the stimulable phosphor being $0.5 \leq T/T_0 \leq 10$, it is preferable in the present invention to contain a fluorine-containing organic compound as the heat-treating atmosphere during the heat treatment. The stimulable phosphor becomes milky-white when heat-treating in air atmosphere, and $T/T_0$ frequently exhibits major drops, whereby luminance (sensitivity) also drops due to scattered stimulated luminescence. On the contrary, the stimulable phosphor does not become milky-white when using a fluorine-containing organic compound. Though this mechanism is not yet fully understood in details, it is assumed that the fluorine-containing organic compound (vapor) is absorbed into the surface of columnar crystals in a stimulable phosphor layer in advance of moisture, oxygen, nitrogen and argon in air or inert gas atmosphere, whereby the foregoing phenomenon influences change in crystal structures during heat-treating and cooling, and thus the appearance of milky-white can be controlled.

It is preferred that a fluorine-containing organic compound used in the present invention, exhibiting a comparatively high vapor pressure and is easy to be vaporized, is employed since the stimulable phosphor characteristics are frequently degraded when heat-treating at high temperatures.

A fluorine-containing organic compound in the present invention is selected from hydrofluoroether (HFE) and others such as fluorine-substituted alkane, fluorine-substituted cycloalkane, and further, ethers containing hydrogen and fluorine atoms, of these, hydrofluoroether (HFE) is preferable.

Useful hydrofluoroethers (HFE), which are ethers containing hydrogen and fluorine atoms, include the following two types:

(1) separate type hydrofluoroether in which a segment such as, an ether-bonded alkyl or alkylene is perfluorinated (e.g., perfluorocarbon group) or fluorinated (e.g., hydrocarbon group), and therefore, is not partial-fluorinated;

(2) ω-hydrofluoroether in which an ether-bonded segment is not fluorinated (e.g., hydrocarbon group), is perfluorinated (e.g., perfluorocarbon ether group), or is partially fluorinated (e.g., fluorocarbon or hydrofluorocarbon group).

Separate type hydrofluoroethers include a mono-, di- or tri-alkoxy-substituted perfluoroalkane or perfluorocycloalkane, and a perfluoroalkyl-containing or perfluorocycloalkylene-containing perfluoroalkane compound. These HFE compounds are preferably those which are described in WO96/22356, represented by following Formula 1:

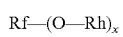

Rf—(O—Rh)$_x$    Formula 1:

in which x is an integer of 1-3 (preferably 1); Rf is a perfluorinated, straight, branched or cyclic hydrocarbon group having a valence number of x (that is, x-valent) and 6-15 carbon atoms. The Rf may.contain heteroatoms which are present in at least one chain; and one or more Rhs are each independently a straight or branched alkyl group having 1-3 carbon atoms (preferably 1 or 2 carbon atoms but more preferably methyl). Of the foregoing HFE, preferred is one in which Rf contains no heteroatom.

Representative example of the hydrofluoroether compound represented by Formula 1 are shown below.

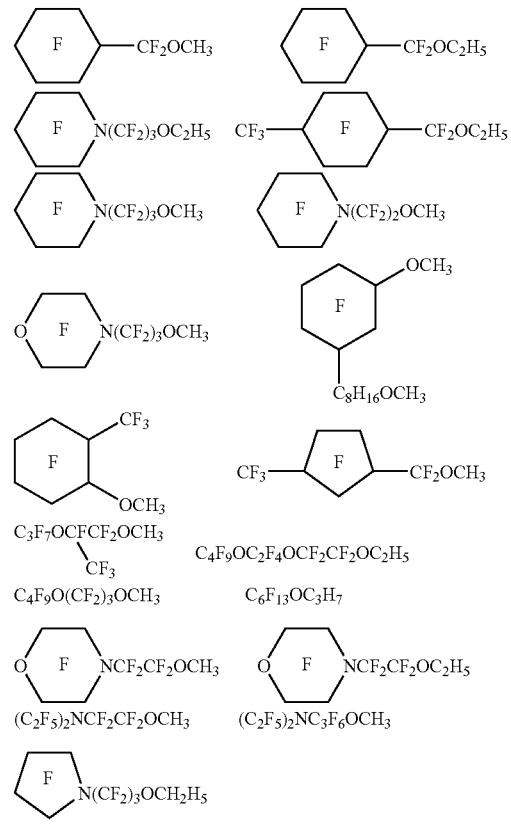

-continued

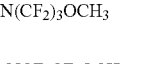

(CF$_3$)$_2$N(CF$_2$)$_3$OCH$_3$    (CF$_3$)$_2$N(CF$_2$)$_2$OC$_2$H$_5$ (C$_2$F$_5$)$_2$NCF$_2$CF$_2$OCH$_3$    C$_2$F$_5$NCF$_2$CF$_2$CF$_2$OC$_2$H$_5$
                                          \
                                          CF$_3$ (C$_3$F$_7$)$_2$NCF$_2$CF$_2$CF$_2$OCH$_3$    (C$_3$F$_7$)$_2$NCF$_2$CF$_2$CF$_2$OC$_2$H$_5$ (C$_3$F$_7$)$_2$NCF$_2$CF$_2$CF$_2$OC$_2$H$_7$

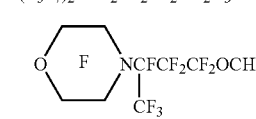

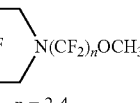

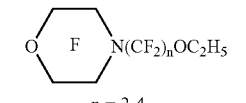

(C$_4$F$_9$)$_2$N(CF$_2$)$_3$OCH$_3$    (C$_2$F$_5$)$_2$N(CF$_2$)$_6$OCH$_3$

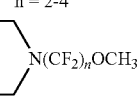

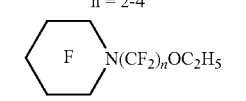

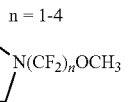

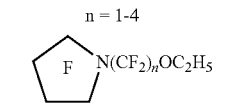

C$_4$F$_9$CF(OC$_2$H$_5$)CF(CF$_3$)$_2$    C$_3$F$_7$CF(OC$_2$H$_5$)CF(CF$_3$)$_2$

C$_2$F$_5$CF(OC$_2$H$_5$)CF(CF$_3$)$_2$    C$_2$F$_5$CF(OCH$_3$)CF(CF$_3$)$_2$

In the foregoing exemplified compounds, the ring structure designated "F" is perfluorinated. The HFE compound may be used alone or as a mixture with another HFE.

Other useful hydrofluoroether compounds include ω-hydrofluoroalkyl ether compound represented by following Formula 2:

X—Rf'—(O—Rf')$_y$—O—R"—H    Formula 2:

in which X is a fluorine or hydrogen atom; Rf' is a divalent perfluorinated organic group having 1-12 carbon atoms; Rf" is a divalent perfluorinated organic group having 1-6 carbon atoms; R" is a divalent organic group having 1-6 carbon atoms, which is preferably perfluorinated; y is an integer of 0-4, and when X is a fluorine atom and y is 0, R" contains at least one fluorine atom, provided that the total fluorinated carbon number is at least 6.

Specific examples of the compound represented by foregoing Formula 2 are shown below:

C$_4$FOC$_2$F$_4$H
HC$_3$F$_6$OC$_3$F$_6$H
C$_5$F$_{11}$OC$_2$F$_4$H
C$_6$F$_{13}$OCF$_2$H
C$_6$F$_{13}$OC$_2$HF$_4$
C$_6$F$_{11}$CF$_2$OC$_2$F$_4$H
HCF$_2$O(C$_2$F$_4$O)$_n$(CF$_2$O)CF$_2$H
C$_3$F$_7$O{C(CF$_3$)CF$_2$O}$_P$CFHCF$_3$
C$_4$F$_8$OCF$_2$C(CF$_3$)$_2$CF$_2$H
HCF$_2$CF$_2$OCF$_2$C(CF$_3$)$_2$CF$_2$OC$_2$F$_4$H
C$_7$F$_{17}$OCFHCF$_3$
C$_8$F$_{10}$OCF$_2$O(CF$_2$)$_5$H
C$_8$F10OC$_2$F$_4$OC$_2$F$_4$OCF$_2$H

Of those compounds, a preferred compound is R'''—OC$_2$H$_5$, in which R''' is a straight or branched perfluoro-alkyl group having 6-15 carbon atoms and is preferably 3-ethoxyperfluoro (2-methylhexane) or CF3CF(CF$_3$)CF(OC$_2$H$_5$)C$_3$F$_7$.

A radiation image conversion panel in which the ratio of transmittance $T/T_0$ at a stimulated luminescence wavelength of the foregoing stimulable phosphor is $0.5 \leq T/T_0 \leq 10$ can be obtained with no milky-white by employing a fluorine-containing organic compound having a boiling point between 50 and 100° C. which features a relatively high vapor pressure and is easy to be vaporized during the foregoing heat treatment. The boiling point described here means one at atmospheric pressure.

It is assumed that the foregoing desired effect can be produced, since the fluorine-containing organic compound (vapor) is sufficiently absorbed into the surface of columnar crystals in a stimulable phosphor layer by using the fluorine-containing organic compound having the boiling point in the temperature range described above.

Using a fluorine-containing organic compound is not essential as long as it features the above boiling point. It is preferably selected from the foregoing compounds, examples of which are fluorine-substituted alkane, fluorine-substituted cycloalkane, and further, ethers containing hydrogen and fluorine atoms, such as hydrofluoroether (HFE).

Examples of fluorine-substituted alkane include 1,1,1,2,2-pentafluoro-3,3-dichloropropane/1,1,2,2,3-pentafluoro-1,3-dichloropropane, pentafluorobutane(boiling point=54° C., ASAHIKLIN AK-225 manufactured by Asahi Glass Co., Ltd.), and examples of cycloalkane also include heptafluorocyclopentane (boiling point=82.5° C., ZEORORA H manufactured by Zeon Corporation).

Ethers having the foregoing boiling point which contain hydrogen and fluorine atoms, such as hydrofluoroether (HFE)

include nonafluorobutylethylether (boiling point=78° C., NOVEC HFE manufactured by Sumitomo 3M, Ltd.), nonafluorobutylmethylether (boiling point=61° C., NOVEC HFE7100 manufactured by Sumitomo 3M, Ltd.), and 1,1,2, 2-hexafluoroethyl-2,2,2-trifluoroethylether (boiling point=56° C., ASAHIKLIN AE-3000 manufactured by Asahi Glass Co., Ltd. or HFE S7 manufactured by Daikin Industries, Ltd.). These products are readily available on the market.

Though it is preferable to remove ambient air and moisture from the heat-treating atmosphere, presence of a small amount of air or inert gas does not cause major problems. It is however preferable that the partial pressure of the fluorine-containing organic compound under the heat-treating atmosphere in coexistence of air, inert gas and the fluorine-containing organic compound is adjusted in consideration of kinds of stimulable phosphor, as well as size and shape of columnar crystals in the stimulable phosphor. The partial pressure of the fluorine-containing organic compound can be adjusted via the oven atmosphere, concentration of coexisting gas in the oven and the vacuum degree. The partial pressure of the fluorine-containing organic compound can be measured by a mass spectroscopy method.

Examples of the stimulable phosphor employable in the image conversion panel of the present invention include phosphors represented by $BaSO_4:A_x$ which are described in Japanese Patent O.P.I. Publication No. 48-80487, phosphors represented by $SrSO_4:A_x$ which are described in Japanese Patent O.P.I. Publication No. 48-80489, phosphors represented by $Na_2SO_4$, $CaSO_4$ or $BaSO_4$ each containing at least one of Dy and Tb which are described in Japanese Patent O.P.I. Publication No. 51-29889, phosphors represented by BeO, LiF, $MgSO_4$ or $CaF_2$ which are described in Japanese Patent O.P.I. Publication No. 52-30487, phosphors represented by $Li_2B_4O_7$:Cu or Ag which are described in Japanese Patent O.P.I. Publication No. 53-39277, phosphors represented by $Li_2O. (Be_2O_2)_x$:Cu,Ag which are described in Japanese Patent O.P.I. Publication No. 54-47883, phosphors represented by SrS:Ce,Sm, SrS:Eu,Sm, $La_2O_2S$:Eu,Sm and(Zn, Cd)S:$Mn_x$ which are described in U.S. Pat. No. 3,859,527, as well as phosphors represented by ZnS:Cu,Pb, barium aluminate phosphors represented by $BaO.xAl_2O_3$:Eu and alkaline earth metal silicate phosphors represented by M(II)O.x-$SiO_2$:A which are described in Japanese Patent O.P.I. Publication No. 55-12142.

Examples of the phosphors further include the following: alkaline earth fluorohalide phosphors represented by $(Ba_{1-x-y}Mg_xCa_y)F_x$:Eu$^{2+}$ which are described in Japanese Patent O.P.I. Publication No. 55-12143, phosphors represented by LnOX:xA which are described in Japanese Patent O.P.I. Publication No. 55-12144, phosphors represented by $(Ba_{1-x}M(II)_x)F_x$:yA which are described in Japanese Patent O.P.I. Publication No. 55-12145, phosphors represented by BaFX:xCe,yA which are described in Japanese Patent O.P.I. Publication No. 55-84389, phosphors of divalent metal fluorohalide activated by rare earth metal represented by M(II)FX·xA:yLn as well as phosphors represented by ZnS:A, CdS:A or (Zn, Cd)S:A ,X which are described in Japanese Patent O.P.I. Publication No. 55-160078, phosphors represented by one of the following formulas which are described in Japanese Patent O.P.I. Publication No. 59-38278:

$xM_3(PO_4)_s.NX_2$:yA and $xM_3(PO_4)_s$:yA, phosphors represented by one of the following formulas which are described in Japanese Patent O.P.I. Publication No. 59-155487:

$nRe_3.mAX'_2$:xEu and $nRe_3.mAX'_2$:xEu, ySm, and phosphors of alkali halide activated by bismuth represented by M(I)X:xBi which are described in Japanese Patent O.P.I. Publication No. 61-228400.

Alkali halide type stimulable phosphors represented by following General Formula (1) such as those described in Japanese Patent O.P.I. Publication Nos. 61-72087 and 2-58000 are particularly preferred.

$M^1X.aM^2X'_2.bM^3X''_3$:eA    General Formula (1)

in which $M^1$ is an alkali metal selected from the group including Li, Na, K, Rb and CS; $M^2$ is a di-valent metal selected from the group including Be, Mg, Ca, Sr, Ba, Zn, Cd, Cu and Ni; $M^3$ is a tri-valent metal selected from the group including Sc, Y, La, Ce, Pr, Nd, Pm, Sm, Eu, Gd, Tb, Dy, Ho, Er, Tm, Yb, Lu, Al, Ga and In; X, X' and X" are each a halogen selected from the group including F, Cl, Br and I; "A" is a metal selected from the group represented by the group including Eu, Tb, In, Ga, Cs, Tm, Dy, Pr, Ho, Nd, Yb, Er, Gd, Lu, Sm, Y, Tl, Na, Ag, Cu and Mg; and "a", "b" and "e" are each a value within the range of $0 \leq a \leq 0.5$, $0 \leq b < 0.5$ and $0 < e \leq 0.2$, respectively.

In General Formula (1), $M^1$ is preferably selected from the group including K, Rb and Cs, and X is preferably selected from the group including Br or I.

$M^2$ is preferably selected from the group including Be, Mg, Ca, Sr and Ba; $M^3$ is preferably selected from the group including Y, Ce, Sm, Eu, Al, La, Gd, Lu, Ga and In; "b" is preferably $0 \leq b \leq 0.01$; and "A" is preferably selected from the group including Eu, Cs, Sm, Tl and Na.

Each of those alkali halide type phosphors forms slender columnar crystals on a support via vapor deposition, which slant at a specific angle to the support. The angle of the crystals may also be vertical to the support. One desirable feature of the use of such a phosphor is that image sharpness is high because diffusion of the stimulated emission light, or the stimulated luminescence in the lateral direction is inhibited by the formation of such columnar crystals. Among the alkali halide type stimulable phosphors, RbBr and CsBr type phosphor are preferable since they provide both high luminance and high image quality.

In the present invention, the phosphors represented by following General Formula (2) are particularly preferred.

CsX;A    General Formula (2)

in which X is Br or I, and "A" is Eu, In, Ga or Ce.

Among these, CsBr type phosphors are preferable since they provide both high luminance and high quality of the image.

In the present invention, the preferable columnar crystals in which the crystals are grown individually in a columnar shape having a specific space between them and can be formed by the method described in Japanese Patent O.P.I. Publication No. 2-58000.

The stimulable phosphor layer composed of independent slender columnar crystals can be obtained via vapor deposition. For example, approximately vertical columnar crystals grown from the support can be obtained by entering the vapor stream in the normal direction to the support surface at an angle of from 0° to 5°. In such a case, it is suitable that the mimimum distance between the support and the crucible is about 10-60 cm which is suitable as the average range of vapor of the stimulable phosphor.

The stimulable phosphor as the evaporation source is charged into the crucible in a uniformly molted state or in a shape state by cold or hot pressing. A degassing treatment is preferably, applied during this process. Though the evaporation of the stimulable phosphors from the evaporation source is carried out by scanning with an electron beam generated by an electron gun, the evaporation may be performed by another suitable method.

It is not always necessary that the evaporation source is a stimulable phosphor, and it may also be a mixture of the raw materials of the stimulable phosphor.

The activator may be added by depositing the mixture of the basic substance and the activator, or by doping the activator after the deposition of the basic substance. For example, in the case of CsBr employed as the basic substance, CsBr is solely vapor deposited and In is doped as the activator. Doping is possible even for a thick layer since the crystals are each independent and the MTF is not lowered because growing the crystals is difficultly. The doping can be performed by thermal diffusion or ion injection into the layer of the basic substance of the phosphor.

The thickness of the layer composed of the columnar crystals formed by the above-described method is preferably 50-1000 pm and more preferably 50-800 µm even though the thickness may vary based on sensitivity to radiation of the objective radiation conversion panel, and on the kind of the stimulable phosphor.

To improve the modulation transfer function (MTF) of the stimulable phosphor layer composed of columnar crystals, the size of the columnar crystal is preferably about 0.5-50 µm and more preferably 0.5-20 µm. The size of the crystals is an average value of the circle-equivalent diameter of each of the columnar crystals observed from the face parallel to the support, which is determined by a microscopic photograph of at least 100 random columnar crystals. When the columnar crystal is thinner than 0.5 µm, the stimulated emission light is scattered by the crystals, and a lowered MTF results, and when the columnar crystal is thicker than 50 µm, the directivity of the stimulated emission light is lowered and a lowered MTF also results.

For gas phase growth or accumulation of the stimulable phosphor, the vapor depositing method, sputtering method and chemical vapor deposition (CVD) method are applicable.

In the vapor deposition method, the support is placed in a vapor deposition apparatus, and air in the apparatus is exhausted while introducing inert gas via an inlet to a vacuum degree of about 1.333 Pa-1.33×10$^{-3}$ Pa. Then at least one of the stimulable phosphors is heated and evaporated by a resistor heating method or an electron beam method, whereby the phosphor is accumulated until the desired thickness is obtained. Thus a stimulable phosphor layer containing no binder is formed. It is also possible in the foregoing vapor deposition process that the stimulable phosphor layer is separately formed plural times. In the vapor deposition process, plural resistor heating devices or electron beams may be employed to perform the vapor deposition. It is also possible in the vapor deposition method that the raw materials of the stimulable phosphor are evaporated by plural resistor heating devices or electron beams so that the objective stimulable phosphor is synthesized on the support while also forming the stimulable phosphor. In the vapor deposition method, the support or substrate may be heated or cooled if necessary.

In the sputtering method, the support is placed in a sputtering apparatus similar in the case of the vapor deposition method, and air in the apparatus is exhausted and replaced with an inert gas such as Ar or Ne to bring the pressure in the apparatus to about 1.33 Pa-1.33×10$^{-3}$ Pa. Then sputtering is performed on the stimulable phosphor as the target, so that the phosphor is accumulated on the support to the desired thickness. In the sputtering process, the sputtering can be performed separately plural times, similarly in the vapor deposition method. The stimulable phosphor layer may be formed by sputtering the target by those methods. It is also possible in the sputtering method to form the objective stimulable phosphor layer on the support by successively or simultaneously sputtering plural raw materials of the stimulable phosphor, or reactive sputtering may be performed by introducing gas such as $O_2$ or $H_2$ as necessary. In the sputtering method, the support may be heated or cooled during sputtering as necessary.

The CVD method is one in which the stimulable phosphor or an organic metal compound is decomposed by energy such as heat or high frequency electric power to form the stimulable phosphor layer containing no binder on the support. By such a method, independent slender columnar crystals of stimulable phosphor can be grown at a designated angle to the normal direction of the support in a gas phase.

These columnar crystals can be obtained by the method described in Japanese Patent O.P.I. Publication No. 2-58000 in which the stimulable phosphor or raw material thereof is supplied in a state of vapor to grow or accumulate the crystals in a gas phase.

The stimulable phosphor layer formed on the support by such a method is excellent in directivity of the stimulated emission light as well as the stimulated luminescence since it contains no binder. Consequently, the thickness of the layer can be thicker than that of the radiation image conversion panel having a dispersion type stimulable phosphor layer in which the stimulable phosphor is dispersed in the binder. Furthermore, scattering of the stimulated emission light in the stimulable phosphor layer is reduced, whereby sharpness of the image is improved.

The space between the columnar crystals may be filled by a filler to strengthen the stimulable phosphor layer. A substance having high light absorbing ability and high reflectance may be used to fill in the space between the columnar crystals. Such filling is effective to strengthen the layer and to reduce diffusion of the incident stimulating light in the lateral direction.

A high reflective substance is one having high reflectance to stimulated emission light of 500-900 nm, but preferably 600-800 nm, and metals such as aluminum, magnesium, copper and indium, white pigments and colorants in the green to red region may be employed.

White pigments also reflect the stimulated luminescence. Examples of such white pigments are anatase and rutile type $TiO_2$, MgO, $PbCO_3 \cdot Pb(OH)_2$, C, $Al_2O_3$, M(II)FX in which M(II) is at least one of Ba, Sr and Ca, and X is at least one of Cl and Br, $CaCO_3$, ZnO, $Sb_2O_3$, $SiO_2$, $ZrO_2$, lithopone ($BaO_4 \cdot ZnS$), magnesium silicate, basic lead silicate-sulfate, basic lead phosphate and aluminum silicate. These white pigments easily scatter the stimulated luminescence by reflecting and refracting the light since the refracting index thereof is high and the sensitivity of the radiation image conversion panel thus obtained is considerably increased.

As a substance of high absorbency, carbon, chromium oxide, nickel oxide, iron oxide and blue colorants, for example, may be employed. Carbon also absorbs stimulated luminescence.

Colorants may be either inorganic or organic. Examples of organic colorants are Sabon Fast Blue 3G manufactured by Hoechst Co., Ltd., Estrol Bril Blue N-3RL manufactured by Sumitomo Kagaku Co., Ltd., D & C Blue No. 1 manufactured by National Aniline Co., Ltd., Spirit Blue manufactured by Hodogaya Kagaku Co., Ltd., Oil Blue No. 603 manufactured by Orient Co., Ltd., Quitone Blue A manufactured by Ciba-Geigy. Co., Ltd., Aizen Carotin Blue GLH manufactured by Hodogaya Kagaku Co., Ltd., Lake Blue AFH manufactured by Kyouwa Sangyo Co., Ltd., Primo Cyanine 6GX manufactured by Inahata Sangyo Co., Ltd., Bril Acid Green 6BH manufactured by Hodogaya Kagaku Co., Ltd., Cyan Blue BNRCS manufactured by Toyo Ink Co., Ltd., and Leionoyl Blue SL manufactured by Toyo Ink Co., Ltd., usable also are organic metal complex colorants such as Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350 and 74460. As inorganic colorants, Prussian blue, cobalt blue, cerulean blue, chromium oxide and $TiO_2$—$ZnO$—$Co$—$NiO$ type pigments may be cited.

As for the support used for the radiation image conversion panel of the present invention, a low moisture permeability support is preferable, and various types of glass, polymer material and metal may be employed. Preferable supports are, for example, plate glass of materials such as quartz, borocilicate glass and chemically tempered glass; plastic film such as cellulose acetate film, polyester film, polyethylene terephthalate film, polyamide film, triacetate film, and polycarbonate film; metal sheets of such as aluminum, iron and copper or metal sheets having a coated layer of oxide of the above metals. The surface of the support may be smooth, or may be matte to enhance adhesion to the stimulable phosphor layer.

In the present invention, the adhesion layer may optionally be provided in advance on the surface of the support to enhance adhesion between the support and the stimulable phosphor layer, as necessary.

The thickness of the support may vary depending on the kind of support and is usually 80-2000 μm, but is preferably 80 to 1000 μm for easier handling.

Of these alkali halide type stimulable phosphors, the RbBr type and CsBr type phosphors exhibiting high luminance and high image quality are preferred. Since they are easily affected by moisture, it is preferable that these are sealed employing a protective layer, a spacer and a sealing agent.

Any material exhibiting high light transmittance and capable of being formed in the form of a sheet may be used as a protective layer. For example, glass plate such as quartz, boron-silicate glass and chemically tempered glass, and organic polymer such as PET, OPP and poly(vinyl chloride) are usable. The protective layer may be either a single or plural layers which may be constituted with two or more layers differing from each other in the employable material, for example, a film composed of two or more laminated layers is usable. Such a laminated film may be produced by, for example, a dry lamination method, an extrusion lamination method and a co-extrusion lamination method. A combination of two or more layers in the protective layer is not limited to that of organic polymers, and a combination of two kinds of glass or a combination of a glass plate and an organic polymer layer may also be employed. The combination of the glass plate and the organic polymer layer may be formed by, for example, a method in which a protective layer coating liquid is directly coated on the glass plate, or a method in which a previously prepared polymer protective layer is adhered onto the glass plate. The two or more layers may be in direct contacted or separated.

The thickness of the protective layer is usually 10 μm -3 mm in practice, and is preferably not less than 100 μm to obtain sufficient moisture resistance and shock-proofing. However, it is more preferably not less than 500 μm, to provide a significantly durable conversion panel via the protective layer. Further, plate glass, when used for the protective layer, is extremely superior in moisture resistance and is specifically preferred.

The protective layer desirably exhibits high transmittance in a broad wavelength region, to effectively transmit stimulated emission light and stimulated luminescence. The transmittance is usually not less than 60%, but is preferably not less than 80%. Materials. meeting the foregoing include quartz glass and borosilicate glass. Borosilicate glass exhibits transmittance of more than 80% in the wavelength region of 330-2600 nm, and quartz glass exhibits high transmittance in the shorter wavelength region.

Additionally, providing an antireflection layer comprised of $MgF_2$, for instance on the surface of the protective layer, is preferred, resulting in effective transmission of stimulated emission light and stimulated luminescence, as well as enhancing sharpness. Refractive index of the protective layer is not specifically defined, and that of many materials used in practice is between 1.4-2.0.

Further, to enhance sharpness, glass may be provided with a function to absorb stimulated emission light by being colored with a coloring agent such as lead phosphate. Also, there are methods of laminating glass with tinted film containing a colorant (pigment or dye) absorbing stimulating light; providing a layer containing dye or pigment by coating on the ether side of glass; allowing a dispersed pigment or coloring agent as a colorant to be contained in the glass itself.

A preparation method of a colored film may be by forming a layer containing a colorant (pigment or dye) via coating on the surface of a plastic film in which a colorant is kneaded. The colored glass may be obtained by adhering a colored plastic film onto a glass surface using an adhesive.

Further, a pigment or dye dispersed or dissolved in a binder (organic polymer such as liquid glass and polyvinyl butyrale), which is easy to adhere to glass, may be directly coated onto the glass.

The colorants used for the protective layer to absorb stimulating light may be either organic or inorganic. Examples of organic colorants include Zapon Fastblue 3G (a product of Hoechst Marion Roussel, Ltd.), Estrol Brillblue N-3RL (a product of Sumitomo Chemical Co., Ltd.), D&C Blue No. 1 (a product of National Aniline Co.), Spirit Blue (a product of Hodogaya Chemical Co., Ltd.), Oilblue No. 603 (a product of Orient Co.), Kiton Blue A (a product of Ciba-Geigy AG. GmbH.), Aisen Catironblue GLH (a product of Hodogaya Chemical Co., Ltd.), Lakeblue AFH (a product of Kyowa Industry Co., Ltd.), Primocyanine 6GX (a product of Inabata & Co., Ltd.), Brillacid Green 6BH (a product of Hodogaya Chemical Co., Ltd.), Cyanblue BNRCS (a product of Toyo Ink Mfg. Co., Ltd.), and Lyonol Blue SL (a product of Toyo Ink Mfg. Co., Ltd.). Also cited are organic metal complex colorants or pigments such as Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, and 74460. Examples of inorganic colorants include ultramarine, cobalt blue, cerulean blue, chromium oxide, and $TiO_2$—$ZnO$—$Co$—$NiO$ type pigments.

Spacer materials are not specifically limited as long as they are capable to maintain the stimulable phosphor layer in an insulated state from an exterior atmosphere, and glass, ceramics, metals and plastics can be employed. The spacer preferably exhibits moisture permeability of less than 30 $g/m^2 \cdot 24$ hr.

The thickness of the spacer is preferably greater than that of the stimulable phosphor layer. Since the width of the spacer is determined mainly based on moisture resistance (moisture permeability) of the tight-sealed portion of this spacer and the support, and this spacer and the protective layer, the width is preferably 1-30 mm. The spacer having too narrow width is not preferred in terms of stability, strength and moisture resistance of the spacer. An excessively broad width is also not preferred because the radiation image conversion panel dimensions increase excessively. Moisture permeability of the tight-sealed portion of the spacer and the support, and of the spacer and the protective layer, is preferably not more than 30 g/m$^2$·24 hr.

The sealing agent is used to seal the spacer tightly to the support and also to the protective layer, with an adhesive agent exhibiting moisture resistance. Specifically, an epoxy type adhesive agent is preferably used since the moisture permeability of the epoxy type adhesive agent is low.

A subbing layer may be formed on the adhesive surface between the support and the protective layer, and a roughening surface treatment may also be conducted to improve adhesion between the spacer and the support, as well as of the tight-sealed portion of the spacer and the protective layer. It is also possible to adhere the support to the protective layer with only the sealing agent without providing a spacer.

In the present invention, a low refractive layer may be provided, which is comprised of material exhibiting lower refractive index than the protective layer. The presence of this layer tends to maintain sharpness even when the protective layer is thick. For example, the following material may be used, which is preferably used as a thin layer formed by a vapor deposition method such as a vacuum evaporation deposition process.

| Material | Refractive index |
|---|---|
| CaF | 1.23-1.26 |
| Na$_2$AlF$_6$ | 1.35 |
| MgF$_2$ | 1.38 |
| SiO$_2$ | 1.46 |

The following aqueous layer materials may also be used.

| Material | Refractive index |
|---|---|
| Ethyl alcohol | 1.36 |
| Methyl alcohol | 1.33 |
| Diethyl alcohol | 1.35 |

As the low refractive layer of the invention, a gaseous layer of ambient air, nitrogen or argon, or an evacuated layer, whose refractive index is substantially 1, is specifically preferred, to maintain sharpness. The thickness of the low refractive layer of this invention is practically 0.05-3000 μm.

The low refractive layer of the invention may be tightly sealed to the stimulable layer, or may be separate from the layer and not be sealed to it. One method to tightly seal the low refractive layer and the stimulable layer is to use an adhesive agent, and in this case, the refractive index of the adhesive agent is preferred to be close to that of the stimulable layer or to that of the low refractive index layer.

FIG. 1 schematically illustrates a radiation image conversion method using the radiation image conversion panel of the present invention.

In FIG. 1, 21 is a radiation generating apparatus, 22 is an object, 23 is a radiation image conversion panel relating to the present invention, 24 is a stimulated emission light source (such as a laser light source), 25 is. the photoelectric conversion device to detect the stimulated luminescence emitted from the conversion panel, 26 is a device to reproduce the signals detected by 25 as an image, 27 is a device to display the reproduced image, 28 is a filter to separate the stimulated luminescence from the stimulated emission light so that only stimulated luminescence is transmitted. Device 25 and the like are not limited to those above, and any system capable to reproduce images from optical information via 23 may be used.

As indicated in FIG. 1, the radiation (R) from radiation generating apparatus 21 passes through object 22, and then enters into radiation image conversion panel 23 (IR). The incident radiation is absorbed by the stimulable phosphor layer of panel 23, and its energy is stored to form the radiation transmission image formed.by accumulating the energy. Subsequently, the accumulated image is excited by the stimulating light from stimulated emission light source 24, to emit the stimulated luminescence.

The intensity of the emitted stimulated luminescence is in proportion to the amount of stored radiation energy, and the optical signal is photoelectrically converted via photoelectric conversion device 25, such as a photomultiplier, after which the thus converted signal is reproduced as an image by image reproducing apparatus 26. The image is subsequently displayed on image display apparatus 27, on which the radiation transmitted image can be viewed.

EMBODIMENT A

Figure 2:
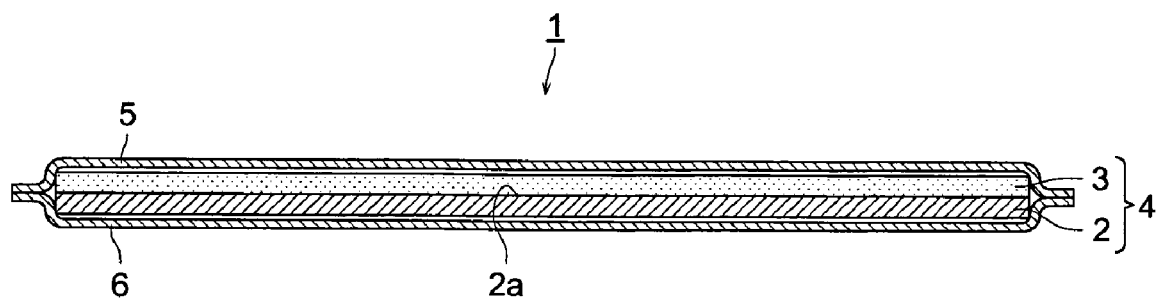
FIG. 2 is a cross-sectional view showing a radiation image conversion panel.

FIG. 2 is a cross-sectional view showing radiation image conversion panel 1 in the present invention. As shown in FIG. 2, radiation image conversion panel 1 possesses phosphor panel 4 in which stimulable phosphor layer 3 is formed on a given substrate 2, and phosphor panel 4 is totally sealed with the first and the second protective films 5 and 6.

Figure 3:
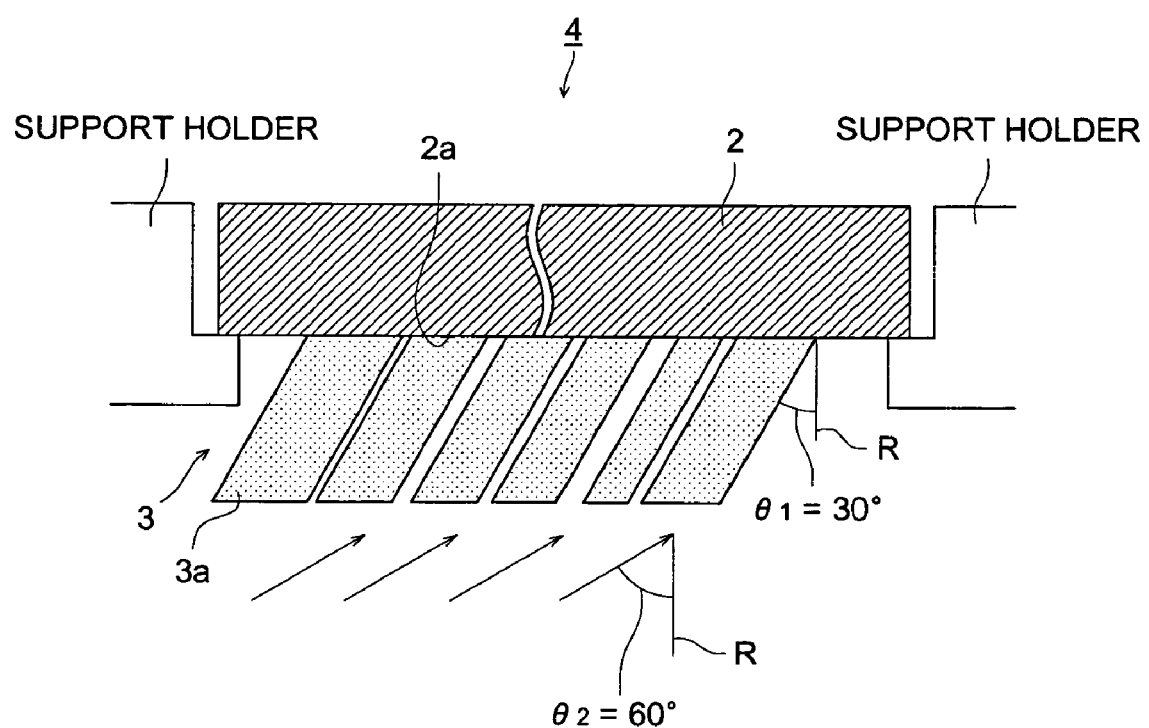
FIG. 3 is an enlarged cross-sectional view showing a phosphor panel.

In FIG. 3, when the incident angle of stimulable vapor stream with respect to normal direction R on a surface 2a of substrate 2 is fixed to support holders in an evaporator is represented by $\Theta 2$, and an inclination angle of columnar crystals 3a to be formed is represented by $\Theta 1$, inclination angle $\Theta 1$ is empirically about half of incident angle $\Theta 2$, resulting in the formation of a large number of columnar crystals 3a. With inclination angle $\Theta 1$ corresponding to incident angle $\Theta 2$, i.e., when the stimulable phosphor vapor stream enters surface 2a of substrate 2 at an incident angle of $\Theta 2 = 60°$, a large number of columnar crystals 3a at an inclination angle of $\Theta 1 = 30°$ can be formed on surface 2a of substrate 2.

Figure 4:
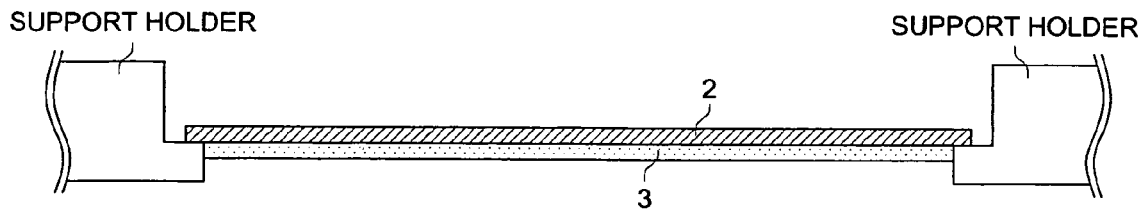
FIG. 4 is a schematic drawing showing each of time flow manufacturing steps according to the method for manufacturing a radiation image conversion panel.
Figure 4:
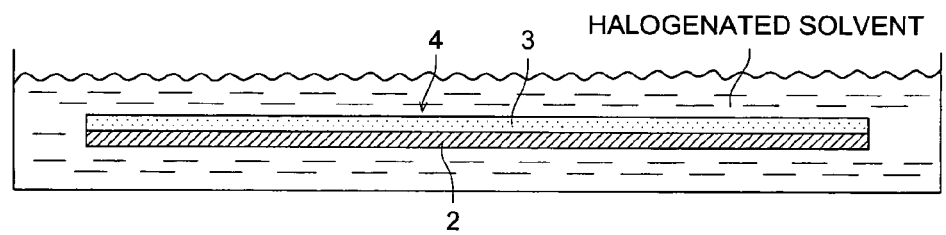
Figure 4:
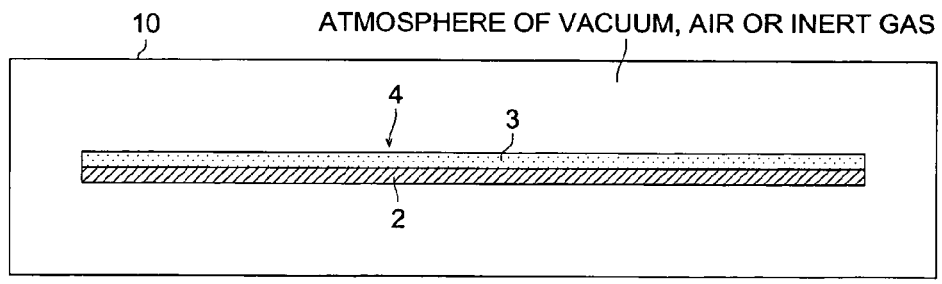
Figure 4:
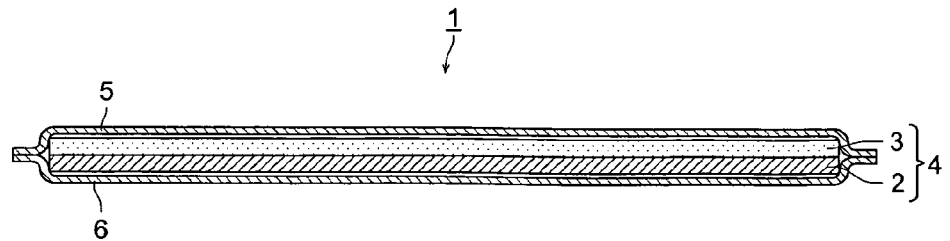
Figure 5A:
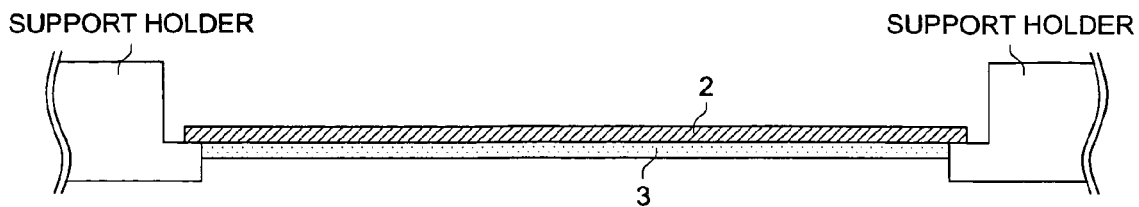
FIG. 5 is a schematic drawing showing each of the time flow manufacturing steps according to the method for manufacturing the radiation image conversion panel in the second embodiment.
Figure 5B:
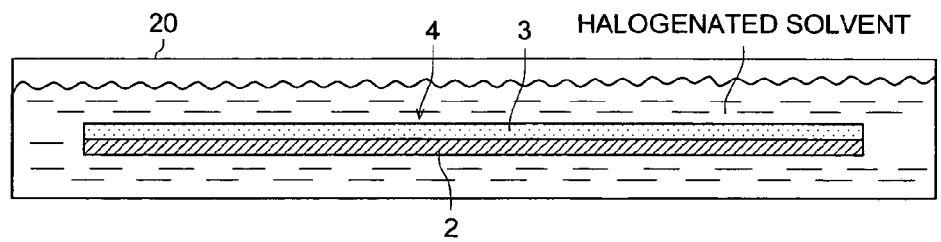
Figure 5C:
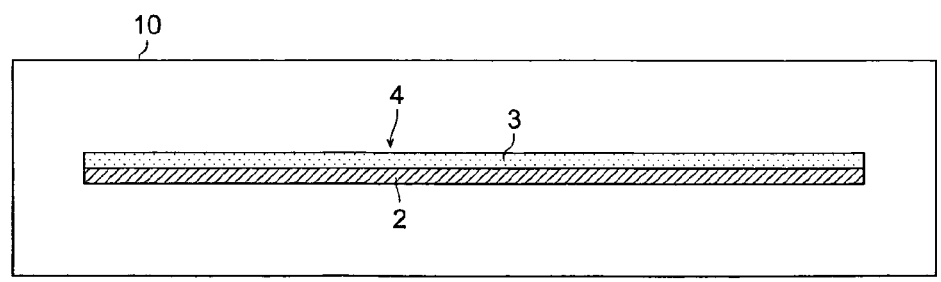
Figure 5D:
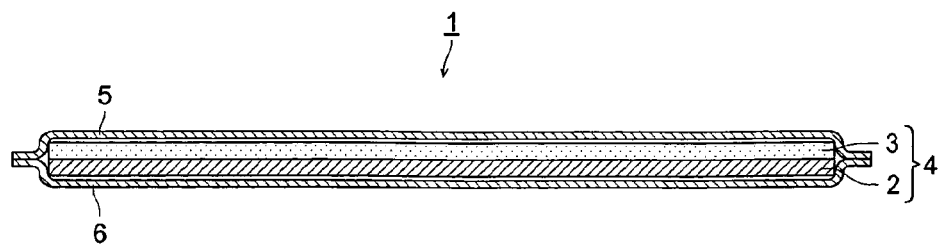

Phosphor panel 4 having stimulable phosphor layer 3 formed on substrate 2 is soaked in the halogenated solvent for a predetermined period of time after the process to form the stimulable phosphor layer, as shown in FIG. 4(b) (soaking process).

A halogenated solvent which is usable in the soaking process is liquid at ordinary temperatures and normal pressure and means a compound in which at least one hydrogen atom is substituted with fluorine atoms, chlorine atoms, bromine atoms and iodine atoms belonging to the halogen family of elements. The halogenated solvent may be: a compound in which each element-to-element bond is only of the structure of a saturated bond, may be a compound having an unsaturated bond, be a cyclic compound, be a compound in the form of.chain and be a compound in which atoms or molecules in a compound are substituted by a hydroxyl group, an ether group, a carbonyl group or a carboxyl group.

A desired compound as the halogenated solvent is a non-flammable solvent exhibiting no flash point from the aspect of conducting heat treatment (1) (to be described later), since the property exhibiting no flash point is required from the aspect of Fire Defense Law concerning inflammability and explosion tendency. In this case, an appropriate heating temperature can be arranged to be set without any regard for the kinds of halogenated solvents used in the heating process, which will be described later.

Recently, it has been considered that known fluorocarbon alternatives are useful from the aspect of environmental concerns (2) and toxicity to living organism (3), including further, the above aspect of (1). HFE (hydrofluoroether) exhibiting excellent properties in (2) and (3) as a fluorocarbon alternative, can suitably be used as the halogenated solvent.

HFE possessing such a property includes NOVEC (TM) HFE-7100, HFE-7100DL and HFE-7200 manufactured by Sumitomo 3M, Ltd, and HFE S7 (product name) manufactured by Daikin Industries, Ltd. Those HFE products available on the market can be used as halogenated solvents which are usable for the soaking process.

After the soaking process, phosphor panel 4 which has been soaked in the halogenated solvent is placed in the interior of constant temperature oven 10, to be set under air or an inert gas (nitrogen or argon) atmosphere as shown in FIG. 4(c), and in this situation, the moisture component is removed from the interior of each of columnar crystals 3a in stimulable phosphor layer 3 of phosphor panel 4 by heating phosphor panel 4 at a temperature in the range between 60 and 200° C. for a predetermined period of time (heating process).

The heat treatment can be finished in a shorter time by setting a higher heating temperature within the range of 60-200° C. in the heating process, and the sensitivity (luminance) of stimulable phosphor layer 3 and the image quality of radiation image conversion panel 1 which is manufactured can also be thus improved. Though an effect as described above may be obtainable, a decline in productivity of radiation image conversion panel 1 occurs, because a longer heating time has to be set in order to obtain desired effect sufficiently, in the case of a heating process temperature of less than 60° C. Accordingly, it is preferred that a heating temperature of not less than 60° C. is employed. On the other hand, it is preferred that a heating temperature of not more than 200° C. is set, due to the tendency of harmful hydrogen halide being generated from the halogenated solvent, in the case of a heating process temperature of more than 200° C.

Phosphor panel 4 may be heated at a predetermined temperature for a short time, after placing phosphor panel 4 into constant temperature oven 10 to dry phosphor panel 4 which has been soaked in a halogenated solvent in a period of time between the soaking process and the heating process (drying process). For example, the drying process can be completed by heating phosphor panel 4 in constant temperature oven 10 at 100° C. for 2 minutes.

In the process of manufacturing radiation image conversion panel 1 in Embodiment A, the amount of stimulated luminescence of a post-manufacture radiation image conversion panel 1 can drastically be increased, since phosphor panel 4 is not simply heat-treated but is heat-treated after phosphor panel 4 has been soaked in a halogenated solvent. Accordingly, unevenness in image density and line noise which occur in typical radiation images can be prevented.

EMBODIMENT B

FIG. 5 is a schematic drawing showing each of time flow manufacturing steps according to a method for manufacturing radiation image conversion panel 1 in Embodiment B. After conducting a process for forming a stimulable phosphor layer as shown in FIG. 5(a), phosphor panel 4 in which stimulable phosphor layer 3 has been formed on substrate 2 is soaked in a halogenated solvent in vessel 20 as shown in FIG. 5(b), and in this state, the halogenated solvent is boiled (or heated) at a temperature of 60° C. to 200° C. to to heat phosphor panel 4 (boiling (or heating) process).

EXAMPLE A

The present invention will be further explained based on examples, but it is obviously not limited to these examples.

Example 1

(Preparation of Radiation Image Conversion Panel 1)

The stimulable phosphor layer containing stimulable phosphor (CsBr:Eu) was formed on the surface of the support of 1 mm thick, 410 mm×410 mm size crystallized glass (manufactured by Nippon Electric Glass Co., Ltd.) using a vapor deposition apparatus.

After evaporation was accomplished, the foregoing support was placeced into the vapor deposition apparatus, and then, raw phosphor material, as an evaporation source (CsBr: Eu), which was previously press molded was provided in a water-cooled crucible.

Then, the interior of the vapor deposition apparatus was evacuated by connecting a pump to an exhaust port, after which nitrogen gas was introduced from a gas supply port {1000 sccm in gas flow [sccm: standard cc/min ($1\times10^{-6}$ $m^3$/min)]} and the vacuum degree inside the apparatus was maintained to be $6.65\times10^{-3}$ Pa. The evaporation source was heated to 650° C., and an alkalihalide phosphor containing CsBr:0.000 Eu was vapor-deposited on one side of the surface of the support from the direction of the line normal to the surface of a support by setting the distance between the support and the evaporation source to 60 cm while transporting the support in the direction parallel to the support. The evaporation was terminated at the point where the thickness of a stimulable phosphor layer reached 400 μm. After the evaporation was finished, the interior of the vapor deposition apparatus was cooled and returned to atmospheric pressure, and transmittance at 440 nm in wavelength of the stimulable phosphor (before heat-treating) was measured after the resulting radiation image conversion panel was removed from the evaporator. Next, radiation image conversion panel 1 was prepared, after both the radiation image conversion panel and a crucible containing 3-ethoxyperfluoro (2-methylhexane) were coexisted in the sealed container and then heat-treated in an oven at 100° C. for 2 hours. Transmittance at 440 nm of the stimulable phosphor (after heat-treating) was measured, based on the resulting radiation image conversion panel 1.

(Preparation of Radiation Image Conversion Panels 2-5)

Radiation image conversion panels 2-5 were similarly prepared, except that 3-ethoxyperfluoro (2-methylhexane) and heating temperature used in the preparation of radiation image conversion panel 1 were changed as shown in Table 1.

(Preparation of Radiation Image Conversion Panels 6-7)

Radiation image conversion panels 6-7 were similarly prepared, except that ambient air was used for the atmosphere without providing 3-ethoxyperfluoro (2-methylhexane), and heating temperatures were changed as shown in Table 1.

Sensitivity and sharpness of resulting radiation image conversion panels 1-7 were evaluated. Evaluation results coupled with the ratio ($T/T_0$) are shown in Table 1.

(Evaluation of Sensitivity)

After X-ray irradiation at a tube voltage of 80 kVp from the rear side of the radiation image conversion panel, the radiation image conversion panel was excited by scanning with He-Ne laser light of 633 nm. Stimulated luminescence emitted from the phosphor layer was captured via a photomultiplier tube (photomultiplier tube R1305, manufactured by Hamamatsu Photonics K.K.) to be converted to an electrical signal, which was recorded on a magnetic tape through an analogue/digital conversion of processing. The record was analyzed by computer to determine the intensity of stimulated luminescence. Luminance was described as a relative value when the luminance of radiation image conversion panel 1 was set to 100.

(Evaluation of Sharpness)

The radiation image conversion panel was exposed to X-ray at a tube voltage of 80 kVp through an MTF chart of lead and then excited by scanning of a semiconductor laser light (at 690 nm). The stimulated luminescence emitted from the phosphor layer was captured with the same light receiving device as above, and converted to electrical signals. The electrical analogue signals were converted to digital signals which were recorded on a hard disc. The record was analyzed via computer to determine the modulation transfer function of the X-ray image. The MTF values (%) were measured space frequency of 1 cycle/mm. The MTF value is rably as high as possible, wherein the higher the MTF is, the better the sharpness. It is preferable that TF exceeds 65% in sharpness of the feasible radiation conversion panel.

Sensitivity obtained from the radiation image conversion panel of this invention is greatly superior to that of the comparative examples, though both sensitivity and sharpness are superior to those of the comparative examples.

Example 2

(Preparation of Radiation Image Conversion Panel 1)

The stimulable phosphor layer containing stimulable phosphor (CsBr:Eu) was formed on the surface of the support of 1 mm thick, 410 mm×410 mm size crystallized glass (manufactured by Nippon Electric Glass Co., Ltd.) using a vapor deposition apparatus.

After evaporation was accomplished, the foregoing support was placed in a vapor deposition apparatus, and then, raw phosphor material, as an evaporation source (CsBr:Eu), which was previously press molded, was placed in a water-cooled crucible.

Then, the interior of the vapor deposition apparatus was evacuated by. connecting a pump to an exhaust outlet, and nitrogen gas was introduced from a gas inlet {1000 sccm in gas flow [sccm: standard cc/min ($1\times10^{-6}$ m$^3$/min)]} and the vacuum degree inside the apparatus was maintained at $6.65\times10^{-3}$ Pa. The evaporation source was heated to 650° C., and an alkalihalide phosphor containing CsBr:0.000 Eu was vapor-deposited on one side of the surface of a support from the direction of the line normal to the surface of a support by setting the distance between the support and the evaporation source to 60 cm while transporting the support in the direction parallel to the support. The evaporation was terminated at the point where the thickness of a stimulable phosphor layer reached 400 μm. After the evaporation was finished, the interior of the vapor deposition apparatus was cooled and returned to atmospheric pressure, and transmittance at 440 nm in wavelength of the stimulable phosphor (before heat-treating) was measured after the resulting radiation image conversion panel was removed. Next, radiation image conversion panel 101 was prepared, after both the radiation image conversion panel and a crucible having NOVEC HFE 7100 (boiling point=61° C., nonafluorobutylmethylether manufactured by Sumitomo 3M, Ltd.) as a fluorine-containing organic compound were coexisted in the sealed container and then heat-treated in an oven at 140° C. for 2 hours.

Table 1 of EXAMPLE A

| Radiation image conversion panel No. | Heat treatment Atmosphere | Temperature (° C.) | $T/T_0$ | Sensitivity (Relative value) | Sharpness (%) | Remarks |
|---|---|---|---|---|---|---|
| 1 | 3-EPF(2-MH) | 100 | 0.95 | 100 | 78 | Present invention |
| 2 | 3-EPF(2-MH) | 60 | 0.80 | 80 | 77 | Present invention |
| 3 | 3-EPF(2-MH) | 140 | 1.00 | 140 | 80 | Present invention |
| 4 | CT-SOLV100 | 100 | 0.90 | 98 | 77 | Present invention |
| 5 | CT-SOLV100 | 140 | 0.98 | 120 | 78 | Present invention |
| 6 | Ambient air | 100 | 0.50 | 70 | 70 | Comparative example |
| 7 | Ambient air | 140 | 0.45 | 75 | 68 | Comparative example |

3-EPF(2-MH): 3-ethoxyperfluoro(2-methylhexane)
CT-SOLV100: perfluoro cyclic ether Transmittance at 440 nm of the stimulable phosphor (after heat-treating) was measured, based on the resulting radiation image conversion panel 101.

Radiation image conversion panel 102 was similarly prepared, except that NOVEC HFE 7100 was changed to HFE S7 (boiling point=56° C.; 1,1,2,2-hexafluoroethyl-2,2,2-trifluoroethylether, manufactured by Daikin Industries, Ltd.).

Radiation image conversion panel 103 was also similarly prepared, except that it was changed to ASAHIKLIN AK-225 (boiling point=54° C.; 1,1,1,2,2-pentafluorb-3,3-dichloropropane/1,1,2,2,3-pentafluoro-1,3-dichloropropane, pentafluorobutane, manufactured by Asahi Glass Co., Ltd.).

Radiation image conversion panel 104 was similarly prepared, except that it was changed to ZEORORA H (boiling point=82.5° C.; heptafluorocyclopentane, manufactured by Zeon Corporation).

Radiation image conversion panel 105 was again similarly prepared, except that it was changed to e Clean 21 F (boiling point=40.2° C.; pentafluorobutane, manufactured by KANEKOKAGAKU Ltd.).

Radiation image conversion panel 106 was similarly prepared, except that it was changed to CT-SOLV100 (boiling point=97° C.; perfluoro cyclic ether, manufactured by Asahi Glass Co., Ltd.).

Radiation image conversion panel 107 was similarly prepared, except that it was changed to Fluorinert FC-3283 (boiling point=128° C.; fluorocarbon, manufactured by Sumitomo 3M, Ltd.).

Similarly prepared was radiation image conversion panel 108, except that it was changed to Fluorinert FC-40 (boiling point=155° C.; fluorocarbon, manufactured by Sumitomo 3M, Ltd.).

Radiation image conversion panel 109 was similarly prepared, except that after evacuating the interior of a crucible, ambient air was introduced into the interior of it to be heated.

Radiation image conversion panel 110 was similarly prepared, except that nitrogen was introduced (normal pressure=atmospheric pressure) into the interior of the crucible to be heated.

According to radiation image conversion panels 101-110 which were prepared as described above, luminance was measured as indicated below, and the MTF values (%) relating. to sharpness at a space frequency of 1 cycle/mm were measured for evaluation, as is the case with Example 1. Results of the evaluation are shown in Table 2.

(Evaluation of Luminance)

To measure luminance, after X-ray irradiation at a tube voltage of 80 kVp from the rear side of each of the radiation image conversion panels, the radiation image conversion panel was excited by scanning with He—Ne laser light of 633 nm. Stimulated luminescence emitted from a phosphor layer was captured with a photomultiplier tube (photomultiplier tube having spectral sensitivity of S-5) to measure the intensity of the light. The intensity was defined as the luminance. Luminance was described as a relative value when the Luminance of radiation image conversion panel 1 in Example 1 was set to 100.

Table 2 of EXAMPLE A

| Radiation image conversion panel No. | Atmosphere | Boiling Point (° C.) | Sensitivity (Luminance) | MTF(%) (1.01 p/mm) | Remarks |
|---|---|---|---|---|---|
| 101 | HFE 7100 | 61 | 150 | 79 | Present invention |
| 102 | HFE S7 | 56.2 | 140 | 76 | Present invention |
| 103 | ASAHIKLIN AK 225 | 54 | 130 | 75 | Present invention |
| 104 | ZEORORA H | 82.5 | 125 | 75 | Present invention |
| 105 | e Clean 21F | 40.2 | 110 | 73 | Comparative example |
| 106 | CT-SOLV100 | 97 | 120 | 72 | Present invention |
| 107 | FC-3283 | 128 | 80 | 71 | Comparative example |
| 108 | FC-40 | 155 | 75 | 71 | Comparative example |
| 109 | Ambient air | — | 70 | 70 | Comparative example |
| 110 | Nitrogen | — | 84 | 70 | Comparative example |

It is to be understood that the radiation image conversion panel which is prepared by conducting heat treatment, using a fluorine-containing organic compound having the boiling point range in the present invention exhibits excellent properties in sensitivity and sharpness.

EXAMPLE B

Plural kinds of samples to manufacture radiation image conversion panels were prepared, and sensitivity (luminance) and image quality (presence or absence of unevenness in image density and line noise) were measured for evaluation.

(1) Preparation of Samples 17 pieces of substrates of 500 μm thick, 10 cm×10 cm size crystallized glass were prepared, and a light reflective layer was formed on one surface of each substrate. Titanium oxide (manufactured by Furuuchi Kagaku Co., Ltd.) and zirconium oxide (manufactured by Furuuchi Kagaku Co., Ltd.) were evaporated by a typical evaporator to form a light reflective layer. Thickness of the light reflective layer was adjusted so as to bring the reflectance to 85% at a wavelength of 400 nm and 20% at a wavelength of 660 nm.

A stimulable phosphor layer was subsequently formed on a light reflective layer of each substrate by evaporating a stimulable phosphor containing CsBr:Eu on the light reflective layer of each substrate. To be more precise first, the interior of a vacuum chamber was heated up to 240° C. after each substrate was set into the vacuum chamber of the evaporator, arranged to face the substrate surface, on which the light reflective layer was formed toward the evaporation source, nitrogen gas was introduced into the vacuum chamber in this situation and the interior of the vacuum chamber was set to 0.1 Pa. Then, the evaporation source and the substrate were placed to be separated from each other by a distance of 60 cm. Next, an aluminum slit was also placed between the evaporation source and the substrate, and vapor streams of a stimulable phosphor material were arranged to be introduced at an incident angle of 30° to the line normal to the substrate surface on which the light reflective layer was formed. Evaporation was subsequently conducted while the substrate was conveyed in the direction of its surface, and a stimulable phosphor layer possessing columnar crystals of 300 μm in thickness was formed on the light reflective layer of each substrate to obtain 17 phosphor panels.

(1-1) Preparation of Sample 1

Polyethylene terephthalate (PET 12) having a thickness of 12 μm on which various types of matting processes were conducted; and PET (VMPET12 manufactured by Toray Advanced Film Co., Ltd.) having a thickness of 12 μm on which alumina was evaporated, were laminated via a dry lamination technique by using two liquid reaction type urethane-containing adhesives to prepare a protective film. Next, after selecting one of the phosphor panels out of 17 pieces which were prepared, a protective film was placed on the phosphor panel. so as to cover the stimulable phosphor layer with one, of the prepared protective films, and a sample to which a protective film was attached onto a substrate of the phosphor panel was designated as Sample 1. The process of manufacturing Sample 1 and others are indicated below in detail, and as shown in Table 1.

(1-2) Preparation of Sample 2

After selecting one of the 17 phosphor panels which were previously prepared, the phosphor panel was placed in a constant temperature oven to be heated in an air atmosphere at a temperature of 100° C. for 2 hours. In the same way as (1-1) described above, to the phosphor panel which was heated, a sample in which a protective film was subsequently attached onto a substrate of the phosphor panel was designated as Sample 2. The process of manufacturing Sample 2 and others are indicated below in detail, and as shown in Table 1.

(1-3) Preparation of Sample 10

After selecting one of the 17 phosphor panels were previously prepared, the phosphor panel was soaked in 10 cc of halogenated solvent for 3 minutes. The phosphor panel which was soaked, was placed in a constant temperature oven to dry at a temperature of 100° C. for 2 minutes and was further heated under air atmosphere at a temperature of 100° C. for 2 hours. Incidentally, some of the halogenated solvent used for the soaking process possibly remained adhered to the phosphor panel, and the phosphor panel may have been heated under a halogenated solvent atmosphere in this heating process. In the same way as (1-1) described above, for the phosphor panel which was heated, a sample in which a protective film is subsequently attached onto a substrate of the phosphor panel, was designated as Sample 10. The process of manufacturing Sample 10 and others are indicated below in detail, and as shown in Table 1.

(1-4) Preparation of Samples 11-15

After selecting 5 of the 17 phosphor panels which were previously prepared, each of the phosphor panels was soaked in 10 cc of halogenated solvent containing a colorant of 0.03 wt % (Neozapon Blau 807; manufactured by BASF AG) for 3 minutes. Next, each of the phosphor panels, which was soaked, was placed in a constant temperature oven to dry at 100° C. for 2 minutes and was further heated under conditions differing from panel to panel. The heating condition in each of the phosphors is shown in Table 1. Incidentally, some halogenated solvent used for the soaking process possibly remained adhered to the phosphor panel, and the phosphor panel may have been heated under a halogenated solvent atmosphere in this heating process.

Aside from the foregoing heating process, polyethylene terephthalate (PET 12) at a thickness of 12 μm on which various types of matting processes were conducted and PET (VMPET12; manufactured by Toray Advanced Film Co., Ltd.) at a thickness of 12 μm onto which alumina was evaporated, were laminated via a dry lamination technique by using two liquid reaction type urethane-containing adhesive to prepare the first protective film. Next, after a 9 μm thick aluminum foil and a 100 μm thick PET were laminated via a dry lamination technique, the second protective film was prepared by coating with a thermal adhesion type lacquer.

In the state of placing the first protective film and the second protective film on the upper side of each of the phosphor panels and on the lower side of the substrate of each of the phosphor panels, respectively, and after those protective films were prepared, they were placed inside a vacuum chamber and gas in the vacuum chamber was converted by introducing helium gas while reducing pressure down to 200 Pa.

Pressure in the vacuum chamber was subsequently readjusted to 7000 Pa, the peripheral areas of the first and the second protective films adhered thermally to each other under this reduced pressure, and each of the phosphor panels was sealed between those protective films using an impulse sealer. Those samples were designated as Samples 11-15. The processes of manufacturing Samples 11-15 and others are indicated below in detail, and as shown in Table 1.

Table 1 of EXAMPLE B

| Sample No. | Soaking process | Halogenated solvent | Heating process Front-end process | Post-process | Colorant which absorbs stimulating light | Number of protective films |
|---|---|---|---|---|---|---|
| 1 | None | — | None | None | Not used | 1 |
| 2 | None | — | Air atmosphere 100° C. 2 hours | None | Not used | 1 |
| 10 | Used | (A) | Air atmosphere 100° C. 2 hours | None | Not used | 1 |
| 11 | Used | (B) | Vacuum atmosphere 60° C. 40 hours | None | Used | 2 |

-continued

Table 1 of EXAMPLE B

| Sample No. | Soaking process | Halogenated solvent | Heating process Front-end process | Heating process Post-process | Colorant which absorbs stimulating light | Number of protective films |
|---|---|---|---|---|---|---|
| 12 | Used | (C) | Argon atmosphere 200° C. 30 min. | None | Used | 2 |
| 13 | Used | (D) | None | Air atmosphere 160° C. 1 hour | Used | 2 |
| 14 | Used | (E) | Nitrogen atmosphere 100° C. 1 hour | Air atmosphere 140° C. 2 hours | Used | 2 |
| 15 | Used | (H) | None | Air atmosphere 140° C. 4 hours | Used | 2 |

Symbols (A)-(E) and (H) in Table 1 indicate the kinds of halogenated solvents used in the soaking process. Specifically, each of them is a compound, as shown below.
(A): NOVEC HFE-7100 ($C_4F_9OCH_3$) manufactured by Sumitomo 3M, Ltd.
(B): NOVEC HFE-7100DL ($C_4F_9OCH_3$) manufactured by Sumitomo 3M, Ltd.
(C): NOVEC HFE-7200 ($C_4F_9OC_2H_5$) manufactured by Sumitomo 3M, Ltd.
(D): HFE S7 ($CHF_2CF_2OCH_2CF_3$) manufactured by Daikin Industries, Ltd.
(E): ASAHIKLIN AK-225 ($CF_3CF_2CHCl_2/CClF_2CF_2CHClF$) manufactured by Asahi Glass Co., Ltd.
(H): SC52S (HCBr type) manufactured by Dipsol Chemicals Co., Ltd.

(1-5) Preparation of Sample 20

After selecting one of the 17 phosphor panels which were previously prepared, the phosphor panel was soaked in 100 cc of halogenated solvent, and the halogenated solvent was heated at a temperature of 60° C. for 24 hours. In this heating process, a sealed stainless vessel was used as a vessel for boiling (or heating), and 10 cc of halogenated solvent was placed into the sealable vessel to boil (or heat). Next, the phosphor panel which was boiled (or heated), was placed in a known constant temperature oven to dry at a temperature of 100° C. for 2 minutes. In the same way as the foregoing (1-1), for the phosphor panel which was dried, a sample in which a protective film was subsequently attached onto a substrate of the phosphor panel was designated as Sample 20. The process of manufacturing Sample 20 and others are indicated below in detail, and as shown in Table 2.

(1-6) Preparation of Samples 21-28

After selecting 8 of the 17 phosphor panels which were previously prepared, each of the phosphor panels was soaked in 100 cc of halogenated solvent containing a colorant of 0.03 wt %. (Neozapon Blau 807; manufactured by BASF AG) for 3 minutes. Next, the halogenated solvent was boiled (or heated) under conditions differing from panel to panel. The boiling (or heating) condition of each of the phosphor panels is described below and as shown in Table 2. In this heating process, a sealed stainless vessel was used for boiling (or heating), and 100 cc of halogenated solvent was placed into the sealable vessel to boil (or heat) the halogenated solvent. Each of the phosphor panels which was boiled (or heated), was subsequently placed in a constant temperature oven to dry at 100° C. for 2 minutes. In the same way as (1-4) described above, to the phosphor panel which was dried, each of the phosphor panels was sealed between a first and a second protective film, and these samples were designated as Samples 21-28. The processes of manufacturing Samples 21-28 and others are indicated below in detail, and as shown in Table 2.

Table 2 of EXAMPLE B

| Sample No. | Soaking process | Halogenated solvent | Heating process (or boiling process) Front-end process | Heating process (or boiling process) Post-process | Colorant which absorbs stimulating light | Number of protective films |
|---|---|---|---|---|---|---|
| 20 | None | — | None | (A) 60° C. 24 hours | Not used | 1 |

-continued

Table 2 of EXAMPLE B

| Sample No. | Soaking process | Halogenated solvent | Heating process (or boiling process) | | Colorant which absorbs stimulating light | Number of protective films |
|---|---|---|---|---|---|---|
| | | | Front-end process | Post-process | | |
| 21 | None | — | None | (B) 140° C. 1 hour | Used | 2 |
| 22 | None | — | None | (C) 200° C. 30 min. | Used | 2 |
| 23 | None | — | None | (D) 140° C. 2 hours | Used | 2 |
| 24 | None | — | None | (A) 140° C. 4 hours | Used | 2 |
| 25 | None | — | None | (E) 140° C. 4 hours | Used | 2 |
| 26 | None | — | None | (F) 140° C. 3 hours | Used | 2 |
| 27 | None | — | None | (G) 140° C. 5 hours | Used | 2 |
| 28 | None | — | None | (H) 140° C. 4 hours | Used | 2 |

Symbols (A)-(E) and (H) in Table 2 indicate kinds of halogenated solvents used in the boiling (or heating) process. Specifically, each of them is the compound shown below.
(A)-(E) and (H): Same as above.
(F): ZEORORA H ($C_5H_3F_7$) manufactured by Zeon Corporation
(G): e Clean 21F ($C_4H_5F_5$) manufactured by KANEKOKAGAKU Ltd.

(2) Measurement of Sensitivity (Luminance)

After X-ray irradiation at a tube voltage of 80 kVp from the rear side (the side on which no stimulable phosphor is formed) of each of Samples 1, 2, 10-15 and 20-28, the stimulable phosphor layer was excited by scanning a semiconductor laser on the surface (the surface on which a stimulable phosphor is formed) of each of those samples. The amount of light (light intensity) of stimulated luminescence emitted from a phosphor layer was captured for each sample via a photomultiplier tube (photomultiplier tube having spectral sensitivity of S-5) to measure the intensity of the light, and the measured intensity was defined as the sensitivity (luminance). The results are indicated below as shown in Table 3. Note that the values of sensitivity of Samples 1, 2, 10-15 and 20-28 were described in relative value when the sensitivity of Sample 1 was set to 1.00.

(3) Evaluation of Image Quality (Presence or Absence of Unevenness in Image Density ans Line Noise)

After X-ray irradiation at a tube voltage of 80 kVp from the back side (the side on which no stimulable phosphor is formed) of each of Samples 1, 2, 10-15 and 20-28, the stimulable phosphor layer was excited by scanning a semiconductor laser on the surface (the surface on which a stimulable phosphor is formed) of each of those samples. The amount of light (light intensity) of stimulated luminescence emitted from the phosphor layer was captured for each sample via a photomultiplier tube (photomultiplier tube having spectral sensitivity of S-5) to be converted to electrical signals. Next, the image based on the converted electrical signal was enlarged twice to be printed out via a common printer. The image quality was evaluated (presence or absence of unevenness in image density and line noise) by visually observing the image after printing.

The above image quality was evaluated twice, right after manufacture (initial stage) and 2 days after manufacture under the condition at a temperature of 80° C. The reason for the image quality to be evaluated after each of the samples was stored for 2 days at 80° C. is that the aging variation in degradation of each of the samples was to be evaluated in a short period of time.

Evaluation results are indicated below, and as shown in Table 3. Note that symbols a, b and c in Table 3 are based on the criteria indicated below.

Table 3 of EXAMPLE B

| Sample No. | Sensitivity (Luminance) | Unevenness in image density and line noise | | Remarks |
|---|---|---|---|---|
| | | Initial stage | After 2 days (at 80° C.) | |
| 1 | 1.00 | c | c | Comparative example |
| 2 | 1.51 | b | c | Comparative example |
| 10 | 2.24 | b | b | Present invention |
| 11 | 2.11 | a | a | Present invention |

Table 3 of EXAMPLE B (continued)

| Sample No. | Sensitivity (Luminance) | Unevenness in image density and line noise | | Remarks |
| --- | --- | --- | --- | --- |
| | | Initial stage | After 2 days (at 80° C.) | |
| 12 | 2.43 | a | a | Present invention |
| 13 | 2.52 | a | a | Present invention |
| 14 | 3.10 | a | a | Present invention |
| 15 | 3.38 | a | a | Present invention |
| 20 | 2.29 | b | b | Present invention |
| 21 | 2.18 | a | a | Present invention |
| 22 | 2.11 | a | a | Present invention |
| 23 | 2.48 | a | a | Present invention |
| 24 | 3.19 | a | a | Present invention |
| 25 | 2.11 | a | a | Present invention |
| 26 | 2.20 | a | a | Present invention |
| 27 | 2.23 | a | a | Present invention |
| 28 | 2.19 | a | a | Present invention |

EFFECT OF THE INVENTION

According to the present invention described in Structures 1-16, provided were a radiation image conversion panel exhibiting high luminance and enhanced sharpness, and a manufacturing method thereof.

In the present invention described in Structure 17, the amount of stimulated luminescence of a post-manufacture radiation image conversion panel can drastically be increased, since such a phosphor panel is not simply heat-treated but is heat-treated after the phosphor panel is soaked in a halogenated solvent. Accordingly, unevenness in image density and line noise which occur in typical radiation images are eliminated.

In the present invention described in Structures 18-19, a heating temperature can optionally be arranged to be set without any regard for the kinds of halogenated solvents used at the time of heat-treating the phosphor panel, since the halogenated solvent is a nonflammable solvent exhibiting no flash point.

In the present invention described in structure 20, dispersion of the stimulating light entering a stimulable phosphor layer can be prevented, since the halogenated solvent contains colorants which absorb the stimulating light, and the colorants penetrate into the stimulable phosphor layer.

What is claimed is:

1. A method for manufacturing a radiation image conversion panel comprising a phosphor panel, said phosphor panel comprising a support having a stimulable phosphor layer thereon;

the method comprising:
(i) producing the phosphor panel via a process comprising vapor depositing the stimulable phosphor layer on the support, the stimulable phosphor layer having a thickness of not less than 50 μm, and containing at least one stimulable phosphor;
(ii) soaking the phosphor panel in a halogenated solvent; and
(iii) heating the phosphor panel after said soaking;
wherein a ratio of transmittance $T/T_0$ at a stimulated luminescence wavelength of the at least one stimulable phosphor is $0.5 \leq T/T_0 \leq 10$, provided that—T represents transmittance after said heating, and $T_0$ represents transmittance before said heating.

2. The method of claim 1, wherein the halogenated solvent is a nonflammable solvent exhibiting no flash point.

3. The method of claim 1, whereIn the halogenated solvent Is hydrofluoroether (HFE).

4. The method of claim 1, whereIn the halogenated solvent contains colorants which absorb stimulating light.

5. A method for manufacturing a radiation image conversion panel comprising
(a) soaking, in a halogenated solvent, a phosphor panel containing a stimulable phosphor layer formed on a substrate via vapor deposition; and
(b) heating the phosphor panel at a temperature in the range between 60 and 200° C. under air or an inert gas atmosphere, after said soaking.

6. The method of claim 5, wherein the halogenated solvent is a nonflamable solvent exhibiting no flash point.

7. The method of claim 5, wherein the halogenated solvent is hydrofluoroether (HFE).

8. The method of claim 5, wherein the halogenated solvent contains colorants which absorb stimulating light.

* * * * *

UNITED STATES PATENT AND TRADEMARK OFFICE
CERTIFICATE OF CORRECTION

PATENT NO. : 7,601,385 B2
APPLICATION NO. : 11/108740
DATED : October 13, 2009
INVENTOR(S) : Morikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this

Fifth Day of October, 2010

David J. Kappos
*Director of the United States Patent and Trademark Office*